United States Patent [19]

Farelli

[11] 4,152,024
[45] May 1, 1979

[54] SLIDABLE SEAT FOR MOTOR VEHICLES

[76] Inventor: Mario Farelli, Corso Giulio Cesare 298, Turin, Italy

[21] Appl. No.: 858,220

[22] Filed: Dec. 7, 1977

[30] Foreign Application Priority Data

Dec. 10, 1976 [IT] Italy ................. 69954 A/76

[51] Int. Cl.² ............................................. A47C 1/02
[52] U.S. Cl. .................................................. 297/341
[58] Field of Search ............... 297/317, 318, 341–343, 297/379

[56] References Cited

U.S. PATENT DOCUMENTS 3,814,476  6/1974  Abbot .................................. 297/379
3,890,001  6/1975  Turner ................................. 297/341

FOREIGN PATENT DOCUMENTS 607328  6/1932  Fed. Rep. of Germany ........... 297/341
 39135  9/1931  France .................................. 297/341

*Primary Examiner*—James C. Mitchell
*Attorney, Agent, or Firm*—Alan H. Levine

[57] ABSTRACT

A slidable front seat for a motor vehicle which slides forwardly when the seat back is pivoted forwardly. The seat back frame has an inverted U-shape and its ends are articulated to a pair of parallel guides on the automobile body floor. Two levers are pivoted between the back frame and two guides, fixed to the seat frame, slidable forwardly and backwardly in the parallel guides. As the seat back is tilted forwardly about the articulation axis, the levers slide the seat forwardly. A pin locks the relatively slidable guides together, the pin being manually movable out of locking position to permit the seat to slide. One of each pair of relatively slidable guides carries a tooth which engages the other guide to limit rearward movement of the seat. The tooth is accommodated within a slot in the other guide, when the seat is in its position of use, to prevent transverse movement of the seat.

3 Claims, 4 Drawing Figures

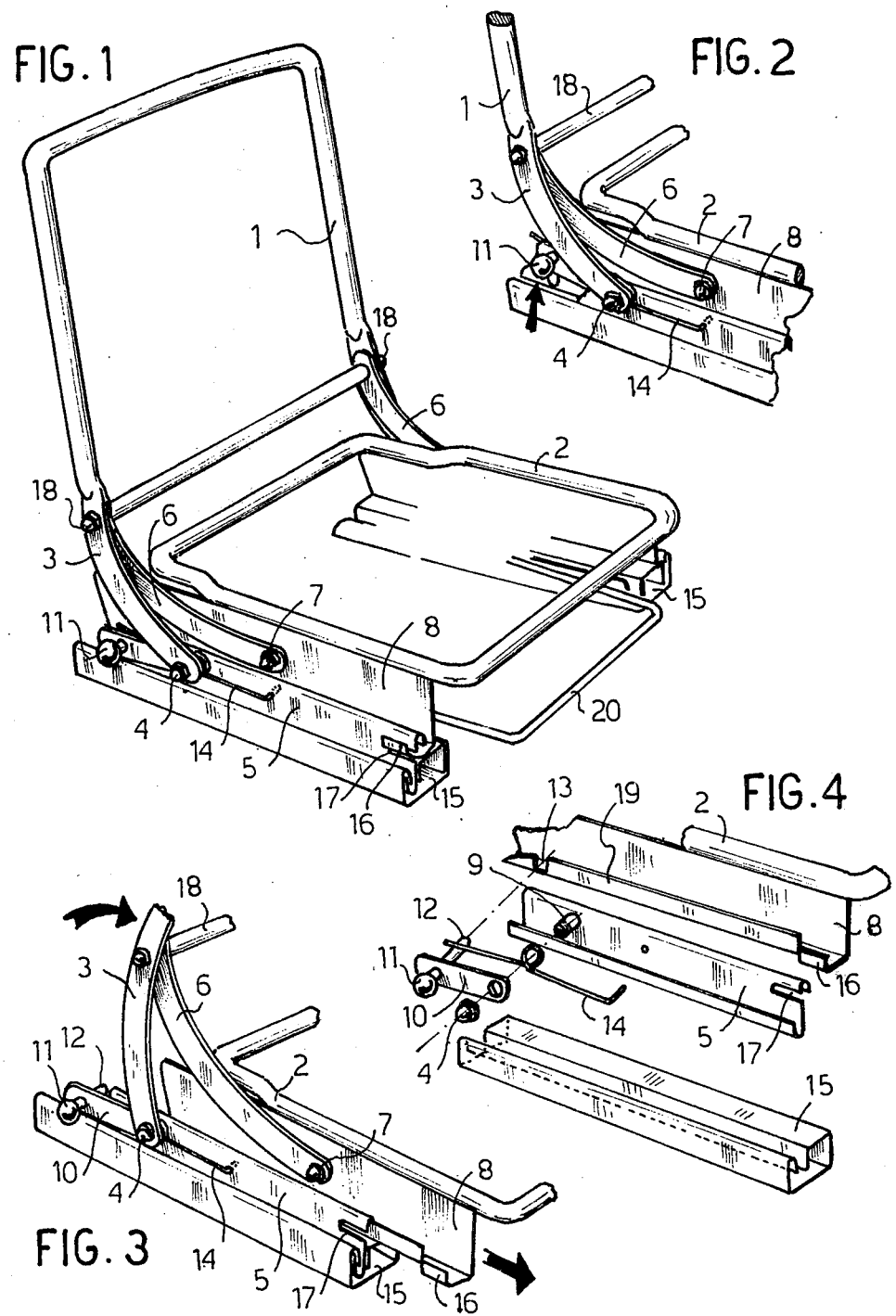

SLIDABLE SEAT FOR MOTOR VEHICLES

The present invention relates to a seat, particularly for use as the front seats of motor vehicles.

The main object of present invention is to provide a frame for separate front seats of motor vehicles, which may be easily pushed forwardly quite far when, particularly in two door automobiles, it is desired to enter the space, or reach the back seat, behind the front seats.

Another object of present invention is to provide a practical and simple mechanism having a moderate cost and high operating reliability.

With the above stated objects in view, the sliding seat according to the invention is characterized by the frame of the seat back, formed by a substantially "U" shaped element, being pivotally connected, at the ends of its branches, to the opposite sides of the seat frame. The ends of the branches serve as the ends of symmetrical levers cooperating with the seat back frame to form a pair of toggle articulations, one on each side of the seat. The toggle articulations are capable of displacing the seat in two opposite directions, with respect to the corresponding fixed guides, by disengaging a latch member and applying to the seat back an angular movement around the axis of the articulations which connect the seat back to the sides of the seat.

Another particular feature of the seat according to the invention resides in the fact that mutually engageable means are provided between the seat frame and the corresponding guides, the engageable means being automatically made active when the seat is returned to its normal use position.

Other features of the invention are described in the following specification with reference to the drawings, which show an illustrative embodiment of the invention.

In the drawings:

FIG. 1 is a perspective view of a frame suitable for providing a seat according to the invention;

FIG. 2 is a fragmentary view showing the locking mechanism acting between the back and the seat;

FIG. 3, similar to FIG. 2, illustrates a phase of the movement of one side of the seat with respect to the corresponding guide; and FIG. 4 is an exploded view illustrating the elements forming one of the two parallel, fixed and mobile, groups of guides which are provided in the seat according to the invention.

As shown in FIG. 1, the seat back frame 1, preferably made of a metal tube bent into a "U" shape, presents bent ends 3 which are articulated at 4 with respect to the profiled guides 5 slidably mounted with respect to two parallel guides 15, respectively, fixed to the floor of the motor vehicle body.

Each guide 5 is telescopically adjustable and lockable in a desired position with respect to its respective guide 15. The locking device is not shown, but is the subject of another patent application in the name of the present applicant.

Therefore, for a clearer description of the present invention, each guide 5 will be assumed to be in the locked state, with respect to the corresponding guide 15, in the position shown in FIGS. 1 and 3. Each guide 5 cooperates with another guide element 8 made integral with each of the two sides of a tubular metal seat frame 2. A pair of symmetrical levers 6 are articulated at 18 on ends 3 of frame 1 and at 7 on sides 8 of seat frame 2. Levers 6 form together with the ends 3, a pair of toggle articulations which force guides 8 to slide with respect to guides 5 when the back 1 is pivoted around the axis of articulations 4. In FIG. 3, the left arrow indicates the movement which may be applied to the back, and the right arrow indicates the initial sliding movement of frame 2, 8 of the seat with respect to guides 5 and 15. The angular movement of the back 1 is normally prevented by latch 12 which, under the action of a resilient means, e.g., a spring 14, engages the notch 13 in the edge 19 of corresponding guide 8. By grasping knob 11 and lifting the latch 12, in the direction of the arrow in FIG. 2, it is then possible to swing seat back frame 1 towards the right in FIG. 1, and at the same time to push the seat 2 forwardly, in the direction of the right arrow in FIG. 3.

The extent of the sliding movement of the parallel guides 8 with respect to guides 5 is proportional to the extent to which the toggles formed by the lever pairs 3, 3 and 6, 6 can open.

As shown in FIGS. 1, 3, and 4, each guide 8 is provided with a terminal tooth 16 which, when the seat is locked, as in FIG. 1, engages a horizontal slot 17 which opens toward the front. This arrangement, provided for both parallel guides of each seat, serves to eliminate troublesome transverse clearances between the telescoping guides which form the sliding track for the seat.

When the back 1 is in the forwardly tilted position and the seat 2 is in the forward position, rotating the seat back in a clockwise direction, in FIGS. 1 and 3, causes the latch 12, under the action of spring 14, to drop automatically into the notch 13, while each tooth 16 enters the corresponding slot 17, and the whole seat returns to the position shown in FIG. 1.

As shown in FIG. 4, the latch 11, 12 is integral with an arm 10 pivoted on pin 9 around which the wire of spring 14 is wound. Pin 9 is integral with guide 5.

A lever 20 forms part of the known mechanism for forward and rearward adjustment of the seat position with respect to the fixed guides.

A remote control comprising a maneuver member connected by a tie rod to the latch 12 is advantageously used and preferably pivoted with respect to the frame 1 outer upright, that is, the nearest to the corresponding door of the body. From the above description, it will be seen that the invention involves a simple and functional seat which utilizes an unobtrusive lever device having a simple structure and a low manufacturing cost.

Obviously, the invention is not limited to the arrangements described and shown, and may be further improved and varied, particularly according to practical use requirements, without departing from the scope of the invention.

What is claimed is:

1. A motor vehicle seat, comprising
   (a) a seat frame carrying two parallel upper guides,
   (b) two parallel lower guides adapted to be fixed to a vehicle floor,
   (c) two parallel intermediate guides interconnecting said upper and lower guides, respectively, each intermediate guide being slidable longitudinally with respect to its respective upper and lower guides,
   (d) a seat back frame pivotally secured to said intermediate guides for pivotal movement about an axis perpendicular to the longitudinal direction of movement of said intermediate and upper guides, and (e) a lever pivotally connected between said seat back frame and each of said upper guides, whereby forward pivotal movement of said seat back frame causes said seat frame and upper guides to move forwardly with respect to said intermediate guides, and said seat and back frame can be moved bodily forwardly and backwardly by moving said intermediate guides longitudinally with respect to said lower guides.

2. A motor vehicle seat as defined in claim 1 including a latch movably mounted on one of said intermediate guides, an opening in the respective one of said upper guides for receiving said latch to lock the two guides together against relative movement, and resilient means urging said latch into said opening.

3. A motor vehicle seat as defined in claim 1 including a tooth projecting laterally from each upper guide, and a slot in each intermediate guide for slidably accommodating its respective tooth when said seat back frame is in its normal rearward position, said teeth sliding out of said slots when said seat back frame is pivoted forwardly to move said upper guides with respect to said intermediate guides.

* * * * *